United States Patent [19]
Honma et al.

[11] 4,116,920
[45] Sep. 26, 1978

[54] SILICONE RUBBER COMPOSITION USEFUL IN SHAFT SEALS

[75] Inventors: Hiroshi Honma; Hiroshi Kakuno, both of Ichihara, Japan

[73] Assignee: Toray Silicone Company, Ltd., Tokyo, Japan

[21] Appl. No.: 867,066

[22] Filed: Jan. 5, 1978

[30] Foreign Application Priority Data

Jan. 13, 1977 [JP] Japan ................................. 52-2778

[51] Int. Cl.² ............................ C08K 3/34; C08K 3/36
[52] U.S. Cl. .................................. 260/37 SB; 252/12
[58] Field of Search ..................... 260/37 SB; 252/12

[56] References Cited

U.S. PATENT DOCUMENTS

| 3,364,160 | 1/1968 | Gölitz et al. | 260/37 SB |
| 3,647,741 | 3/1972 | Hutchinson | 260/37 SB |
| 3,865,778 | 2/1975 | Christie | 260/37 SB |

Primary Examiner—James H. Derrington
Attorney, Agent, or Firm—Robert L. McKellar

[57] ABSTRACT

What is disclosed is a silicone rubber shaft seal and a composition for its preparation which consists of filled, heat curable silicone rubber and acicular platy mineral powders.

4 Claims, No Drawings

SILICONE RUBBER COMPOSITION USEFUL IN SHAFT SEALS

BACKGROUND OF THE INVENTION

This invention deals with the discovery that certain materials can be added to durable curable silicone rubbers to prevent noise build-up from friction caused when a shaft turns in a shaft seal.

With the advent of powered mechanical drive shafts and the necessary lubrication to keep such shafts friction free, there was developed shaft seals to keep the lubrication from leaking away from the shaft. These early shaft seals took the form of packings rather than coherent forms and often required repacking, very often resulting in down time for the machine containing such shafts.

Later on, coherent, one-piece shaft seals were developed and were made from organic rubbers and fillers. These organic rubbers were susceptible to degradation by the lubrication products and the breakdown products of such lubricants caused by long periods of use.

Producers then switched to the more durable silicone rubbers because they were essentially resistant to many lubricants and their degradation products and were physically tougher than most organic rubbers.

The silicone rubbers, however, has a slight disadvantage, in that, they tend to cause noise when they are in contact with a moving part, such as a shaft, because of friction between the silicone rubber and the shaft. The friction between the shaft seal and the shafts turning face will generate noise after being in use a long period of time. The abrasion caused thereby will spread over the gap between the shaft's turning face and the seal which will eventually result in an oil leak.

There has now been found a way to reduce or eliminate the noise made by a moving part against a silicone rubber seal.

THE INVENTION

The aforementioned problems can be overcome by the use of a curable silicone rubber composition as a shaft seal which consists of (A) 100 parts by weight of a heat curable organopolysiloxane rubber; (B) 5–100 parts by weight of a reinforcing silica filler; (C) 5–100 parts by weight of diatomaceous earth; (D) 2–100 parts by weight of an acicular platy mineral powder and, (E) 0.1–10 parts by weight of an organic peroxide, wherein the weight of the components (B), (C), (D) and (E) are based upon 100 parts of (A) and there is present 30 to 150 parts by weight of components (B), (C) and (D) in the total composition (A) to (E).

Component (A) of this invention is any heat curable silicone rubber which can be molded in the form of a seal. Component (A) is the principal component of organopolysiloxane rubber. It is a high molecular weight straight chain or branched chain organopolysiloxane. The organic side chain substitution on the silicon atoms is methyl, ethyl, vinyl, phenyl or trifluoropropyl groups. Fifty molar % or more of the methyl groups is preferable. The terminal group can be any group and is usually a hydroxyl, alkoxyl, methyl, vinyl or phenyl group. (A) is generally used in 100 parts.

Component (B) is a reinforcing silica filler such as fumed silica, precipitated silica or one of these silicas which has been dried. Component (B) is employed in order to impart sufficient mechanical strength to the silicone rubber. The quantity of component (B) should be 5–100 parts by weight and preferably 20–70 parts by weight per 100 parts by weight of component (A).

Component (C) is diatomaceous earth and improves the silicone rubber's hardness and resistance to oil. Other silica fillers employed are easily abraded and generate noise when used as shaft seals. However, diatomaceous earth does not possess these defects. The amount of component (C) is 5–100 parts by weight and preferably 20–90 parts by weight per 100 parts by weight of component (A).

Component (D) is a acicular platy mineral powder which endows the silicone rubber with its lubricating properties, ability to decrease noise and resistance to abrasion. Component (D) is the most important component of the silicone rubber composition produced by the method of this invention. Examples of this type of mineral are the ferrosilicates and graphite. The silicone rubber's lubrication against the metal surface increases as the quantity of component (D) is increased which results in a decline in abrasion and the noise generated by the friction between the silicone rubber composition and the metal's turning surface. Component (D) is used in 2–100 parts by weight and preferably 5–50 parts by weight of component (D) should be used per 100 parts by weight of component (A).

Although the individual quantities of each of components (B), (C) and (D) are specified above, the combined quantity of components (B), (C) and (D) must be 30–150 parts by weight per 100 parts by weight of component (A) to achieve the proper effect. When this total quantity is less than 30 parts by weight, the resulting silicone rubber is soft and its resistance to oil is insufficient for use as a shaft sealing material. When this total quantity exceeds 150 parts by weight, the silicone rubber composition mixture is difficult to knead, vulcanize and mold with the result that again it cannot be used as shaft sealing material. Components (B) and (C) are traditional fillers for silicone rubber and some of the materials which comprise component (D) are also traditional silicone rubber fillers. A mixture of the above-mentioned traditional fillers in the prescribed quantities has been found to provide the silicone rubber composition with those properties appropriate for its application as a shaft sealing material.

The organic peroxide which comprises component (E) is the traditional catalyst employed for heat curing silicone rubber. Examples of useful organic peroxides are benzoyl peroxide, t-butyl perbenzoate, 2,4-dichlorobenzoyl peroxide, monochlorobenzoyl peroxide, dichloro peroxide and 2,5-bis-(t-butylperoxy) -2,5-dimethylhexane. Components (A)–(D) may each be composed of only one of the compounds described for each component or a particular component may be a mixture of two or more compounds. The silicone rubber composition of this invention is a mixture of the above-mentioned component (A)–(D).

Additives can be added to this mixture, for example, low molecular weight organosilicon compounds with low degrees of polymerization and terminal hydroxyl groups. Polydimethylsiloxane, diphenylsilanediol and diphenylmethylsilanol are specific examples of these additives. Other examples of additives are those organopolysiloxanes which contain a large number of vinyl groups and have low degrees of polymerization, pigments, heat stabilizers and oil resistant agent. The order for mixing components (A)–(D) is optional. Component (A) is usually mixed first with component (B) using a kneader mixer. The resulting mixture is then mixed with component (C)–(D) using a kneader mixer or a double-roll and this is finally mixed with component (E) using a double roll. The resulting slicone rubber composition is heat cured at 100°–180° C. under atmospheric or elevated pressure for several minutes, and if necessary is subsequently vulcanized in order to improve its mechanical properties, oil resistance and resistance to abrasion. The resulting silicone rubber composition is an excellent shaft sealing material which will not generate noise.

moldings were tested on an oil seal rotary tester with the tester's shaft turning at 3,000 rpm. As an additional test, five judges would move slowly away from the tester and each specified the distance at which the noise due to friction could not be heard.

The oil resistance was tested by the following method. A vulcanized test piece was immersed in 10W30 motor oil or ASTM No. 3 oil in a reflux test tube which was allowed to stand at 150° C. in a thermobath for 70 hours. The volume change in the test piece was measured.

Table I

| Component | Material | Example 1 | Example 2 | Example 3 | Example 4 | Comparison Example 1 | Comparison Example 2 | Comparison Example 3 | Comparison Example 4 | Comparison Example 5 |
|---|---|---|---|---|---|---|---|---|---|---|
| A | Raw methylvinylpolysiloxane rubber | 100 | 100 | 100 | 100 | 100 | 100 | 100 | 100 | 100 |
| B | Hydrophobic fumed silica | — | — | 25 | 40 | — | — | — | 40 | 40 |
| B | Precipitated silica | 35 | 35 | — | — | 35 | 35 | — | — | — |
| C | Diatomaceous earth | 60 | 20 | 40 | 60 | 60 | — | 60 | 50 | — |
| D | Extremely fine quartz powder | — | — | — | — | — | — | — | — | 50 |
| D | Extremely fine mica powder | 10 | 50 | — | — | — | 10 | 10 | — | — |
| D | Talc powder | — | — | 5 | 20 | — | — | — | — | 20 |
| E | 50% silicone oil paste of 2,5-dimethyl-2,5-di-t-butylperoxy)hexane | 0.5 | 0.5 | 0.5 | 0.5 | 0.5 | 0.5 | 0.5 | 0.5 | 0.5 |
|  | Polydimethyl siloxane, low degree of polymerization and hydroxyl terminal groups | 6 | 6 | — | — | 6 | 6 | 6 | — | — |

| Properties | Example 1 | Example 2 | Example 3 | Example 4 | Comparison Example 1 | Comparison Example 2 | Comparison Example 3 | Comparison Example 4 | Comparison Example 5 |
|---|---|---|---|---|---|---|---|---|---|
| Hardness (JIS) | 77 | 74 | 61 | 80 | 76 | 50 | 48 | 75 | 72 |
| Tensile strength (kg/cm$^2$) | 58 | 50 | 60 | 66 | 55 | 68 | 15 | 62 | 51 |
| Elongation at break (%) | 190 | 170 | 280 | 200 | 210 | 430 | 380 | 230 | 250 |
| Distance at which noise due to friction cannot be heard (m) | 7 | 1 | 10 | 3 | 20 | 20 | 15 | 23 | Longer 25 |
| Change in volume (%) |  |  |  |  |  |  |  |  |  |
| Motor oil 10W30 | 17 | 15.2 | 18.2 | 14.4 | 17.7 | 22 | 18.9 | 15.5 | 21.8 |
| ASTM No. 3 oil | 29.5 | 32.0 | 32.1 | 27.4 | 30.9 | 42.9 | 35.5 | 28.8 | 37.8 |

EXAMPLE

A silicone rubber composition was kneaded using a kneader mixer and then a double roll. It was composed of (1) raw methyl-vinylpolysiloxane rubber (99.84% methyl groups, 0.16% vinyl groups, degree of plasticity 160° at 25° C., terminal blocked with vinyl groups),
(2) Precipitated silica, relative surface area 240 m$^2$/g or hydrophobic fumed silica, relative surface area 200 m$^2$/g (see the accompanying table),
(3) Diatomaceous earth,
(4) Extremely fine mica or talc powder and
(5) A 50% silicone oil paste of 2,5-dimethyl,2,4-(di-t-butyl peroxy)hexane.

For the purposes of comparison a silicone rubber composition was produced by the same method as above with the modifications that component (C) was an extremely fine quartz powder and a polydimethylsiloxane additive was used (viscosity 50 cSt at 25° C., low degree of polymerization, hydroxyl group terminals). The quantity of each component is given in Table I. The resulting silicone rubber compositions were heat treated at 170° C. for 10 minutes using a hot press, subsequently vulcanized in an oven at 200° C. for 4 hours and were molded into 2 mm thick sheets. The hardness, tensile strength and elongation at break (using dumbell No. 3) were tested according to the method prescribed by JIS K6301. The silicone rubber compositions were placed in metal molds for oil seals and then heat treated under the conditions mentioned above. The resulting That which is claimed is:

1. A silicone rubber composition which is useful as a shaft seal which consists essentially of
   (A) 100 parts by weight of a heat curable organopolysiloxane rubber,
   (B) 5–100 parts by weight of a reinforcing silica filler;
   (C) 5–100 parts by weight of diatomaceous earth;
   (D) 2–100 parts by weight of an acicular platy mineral powder and,
   (E) 0.1–10 parts by weight of an organic peroxide,
   wherein the weight of the components (B), (C), (D) and (E) are based upon 100 parts of (A) and there is present 30 to 150 parts by weight of components (B), (C) and (D) in the total composition (A) to (E).

2. A silicone rubber composition as claimed in claim 1 wherein (A) is a curable, high molecular weight organopolysiloxane, endblocked by vinyl groups and containing greater than fifty mole percent methyl groups, (B) is precipitated silica having a surface area of 240 m$^2$/g; (C) is diatomaceous earth; (D) is acicular platy mica and (E) is 2,5-dimethyl 2,4-(di-t-butyl peroxy)hexane.

3. A silicone rubber composition as claimed in claim 1 wherein (A) is a curable, high molecular weight organopolysiloxane, endblocked by hydroxyl groups and containing greater than fifty mole percent methyl groups, (B) is precipitated silica having a surface area of 240 m$^2$/g; (C) is diatomaceous earth; (D) is acicular platy mica and (E) is 2,5-dimethyl 2,4-(di-t-butyl peroxy)hexane.

4. An article of manufacture which is a shaft seal which consists essentially of
  (A) 100 parts by weight of a heat curable organopolysiloxane rubber,
  (B) 5-100 parts by weight of a reinforcing silica filler;
  (C) 5-100 parts by weight of diatomaceous earth;
  (D) 2-100 parts by weight of an acidular platy mineral powder and,
  (E) 0.1-10 parts by weight of an organic peroxide, wherein the weight of the components (B), (C), (D) and (E) are based upon 100 parts of (A) and there is present 30 to 150 parts by weight of components (B), (C) and (D) in the total composition (A) to (E).

* * * * *

UNITED STATES PATENT AND TRADEMARK OFFICE
CERTIFICATE OF CORRECTION

PATENT NO. : 4,116,920
DATED : September 26, 1978
INVENTOR(S) : HIROSHI HONMA ET AL It is certified that error appears in the above-identified patent and that said Letters Patent are hereby corrected as shown below:

Column 1, line 27, "has" should read --have--

Table 1, Component E, line 3, "di-t-butylperoxy)hexane" should read --(di-t-butylperoxy)hexane--

Signed and Sealed this

Twenty-fifth Day of September 1979

[SEAL]

Attest:

LUTRELLE F. PARKER
Attesting Officer   Acting Commissioner of Patents and Trademarks